United States Patent
Ko et al.

(10) Patent No.: US 9,136,917 B2
(45) Date of Patent: Sep. 15, 2015

(54) SYSTEM FOR CONTROLLING INTER CELL INTERFERENCE IN CELLULAR MOBILE SYSTEM

(75) Inventors: Young-Jo Ko, Daejeon (KR); Jae Young Ahn, Daejon (KR); Heesoo Lee, Daejeon (KR); Bangwon Seo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 255 days.

(21) Appl. No.: 12/722,070

(22) Filed: Mar. 11, 2010

(65) Prior Publication Data

US 2010/0234054 A1    Sep. 16, 2010

(30) Foreign Application Priority Data

| Mar. 11, 2009 | (KR) | 10-2009-0020690 |
| Mar. 18, 2009 | (KR) | 10-2009-0023043 |
| Apr. 22, 2009 | (KR) | 10-2009-0034965 |
| Apr. 29, 2009 | (KR) | 10-2009-0037764 |

(51) Int. Cl.
*H04B 7/02* (2006.01)
*H04B 7/06* (2006.01)

(52) U.S. Cl.
CPC .............. *H04B 7/024* (2013.01); *H04B 7/0639* (2013.01)

(58) Field of Classification Search
CPC ............................. H04B 7/024; H04B 7/0639
USPC ............................. 455/422.1, 158.1, 450, 63.1
See application file for complete search history.

(56) References Cited

U.S. PATENT DOCUMENTS

| 8,472,968 | B1* | 6/2013 | Kim ........................ 455/452.2 |
| 2009/0061842 | A1* | 3/2009 | Park et al. .................. 455/422.1 |
| 2009/0117911 | A1* | 5/2009 | Molisch et al. .............. 455/450 |
| 2009/0197588 | A1* | 8/2009 | Khandekar et al. ........ 455/422.1 |
| 2009/0245085 | A1* | 10/2009 | Tao et al. ..................... 370/208 |
| 2009/0245086 | A1* | 10/2009 | Tao et al. ..................... 370/208 |
| 2009/0312027 | A1* | 12/2009 | Foschini et al. .............. 455/446 |
| 2010/0035555 | A1* | 2/2010 | Bala et al. .................... 455/63.1 |
| 2010/0099428 | A1* | 4/2010 | Bhushan et al. ........... 455/452.1 |
| 2010/0136994 | A1* | 6/2010 | Kim et al. .................... 455/450 |
| 2010/0220682 | A1* | 9/2010 | Tao et al. ..................... 370/330 |

FOREIGN PATENT DOCUMENTS

| EP | 1919231 A1 | 5/2008 |
| KR | 1020080056920 | 6/2008 |

OTHER PUBLICATIONS

Samsung, "Further discussion on Inter-Cell Interference Mitigation through Limited Coordination," 3GPP TSG RAN WG1 Meeting #55, R1-084173, 11 pages, (2008).

* cited by examiner

*Primary Examiner* — Bobbak Safaipour
*Assistant Examiner* — Devan Sandiford
(74) *Attorney, Agent, or Firm* — Nelson Mullins Riley & Scarborough LLP; Anthony A. Laurentano, Esq.

(57) ABSTRACT

Provided is a technology that eliminates or decreases inter-cell interference through an inter-cell cooperation in a cellular mobile communication system. A terminal generates channel state information (CSI) with respect to a plurality of base station, and transmits the CSI to a serving cell. The serving cell shares the CSI with a cooperation cell, and determines a cooperation transmission mode that decreases interference from the cooperation cell.

9 Claims, 6 Drawing Sheets

SYSTEM FOR CONTROLLING INTER CELL INTERFERENCE IN CELLULAR MOBILE SYSTEM

CROSS-REFERENCE TO RELATED APPLICATION

This application claims the benefit of Korean Patent Application No. 10-2009-0020690, filed on Mar. 11, 2009, and to Korean Patent Application No. 10-2009-0023043, filed on Mar. 18, 2009, and to Korean Patent Application 10-2009-0034965, filed on Apr. 22, 2009, and to Korean. Patent Application No. 10-2009-0037764, filed on Apr. 29, 2009 in the Korean Intellectual Property Office, the disclosure of which is incorporated herein by reference.

BACKGROUND OF THE INVENTION

1. Field of the Invention

The present invention relates to a mobile communication, and more particularly, to a system controlling inter-cell interference.

2. Description of the Related Art

There are limits to improving a data transmission rate of a terminal located in a cell boundary due to interference from other cells. An inter-cell cooperation communication is used for improving the data transmission rate of the terminal located in the cell boundary, and may be one of various candidate technologies to be applied to an LTE-Advanced system of 3GPP.

An inter-cell cooperation communication for OFDMA downlink that is discussed for the LTE-Advanced system may be classified into the following two fields:

1) Joint Processing: A terminal receives data transmitted from a plurality of transmission points.

2) Coordinated Scheduling: A terminal receives data transmitted from a single transmission point such as a single cell generated by a base station or a relay. Scheduling, precoding, or beamforming of the terminal may be performed by a cooperation of a plurality of cells.

A multi-cell cooperation transmission scheme described in the present embodiments is not limited to a general cell. Hereinafter, a cell includes a concept of a relay node. A multi-cell cooperation transmission/reception scheme may be applied to various cooperation transmission/reception types, such as a cooperation transmission/reception between general cells, a cooperation transmission/reception between relay nodes, a cooperation transmission/reception between general cells and relay nodes, and the like. Inter-cell communication is needed to perform the cooperation transmission/reception. The inter-cell communication may be performing through a backbone network connected to a network, may be performed through a dedicated line directly connecting cells, or may be performed through a wireless communication between the cells. In the wireless communication between the cells, radio resources used for the wireless communication may be a portion of a frequency band used for communication between a cell and a terminal or may be another frequency band separated from the frequency band used for the communication between the cell and the terminal.

SUMMARY OF THE INVENTION

An aspect of the present invention provides a method and apparatus of controlling inter-cell interference in a cellular mobile communication system.

Another aspect of the present invention provides a method and apparatus of decreasing a strength of inter-cell interference transmitted from a cooperation cell to the terminal.

According to exemplary embodiments of the present invention, there may be provided a serving cell, and the serving cell includes a receiving unit to receive, from a terminal, information associated with a first channel between the serving cell and the terminal, and to receive, from the terminal, information associated with a second channel between a cooperation cell adjacent to the serving cell and the terminal, a transmission mode determining unit to determine a cooperation transmission mode with the cooperation cell based on the information associated with the first channel and information associated with the second channel, and a transmitting unit to transmit data to the terminal based on the cooperation transmission mode.

According to exemplary embodiments of the present invention, there may be provided a terminal, and the terminal includes a channel information generating unit to generate information associated with a first channel between the terminal and a serving cell, and to generate information associated with a second channel between the terminal and a cooperation cell, a transmitting unit to transmit, to the serving cell, the information associated with the first channel and the information associated with the second channel, and a receiving unit to receive data transmitted according to a cooperation transmission mode determined based on the information associated with the first channel and information associated with the second channel.

According to exemplary embodiments of the present invention, there may be provided a cooperation cell, and the cooperation cell includes a transmitting unit to transmit a pilot signal to a terminal, and a receiving unit. The terminal may transmit, to a serving cell, information associated with a channel between the terminal and the cooperation cell, and the serving cell may determine a cooperation transmission mode with respect to the terminal based on the information associated with the channel, the channel being generated based on the pilot signal, the receiving unit may receive information associated with the cooperation transmission mode, and the transmitting unit may transmit data to the terminal based on the cooperation transmission mode.

According to the present invention, inter-cell interference may be controlled in a cellular mobile communication system.

According to the present invention, a strength of inter-cell interference transmitted from a cooperation cell to a terminal may be decreased.

Additional aspects and/or advantages will be set forth in part in the description which follows and, in part, will be apparent from the description, or may be learned by practice of the embodiments.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE PREFERRED EMBODIMENT

Figure 1:
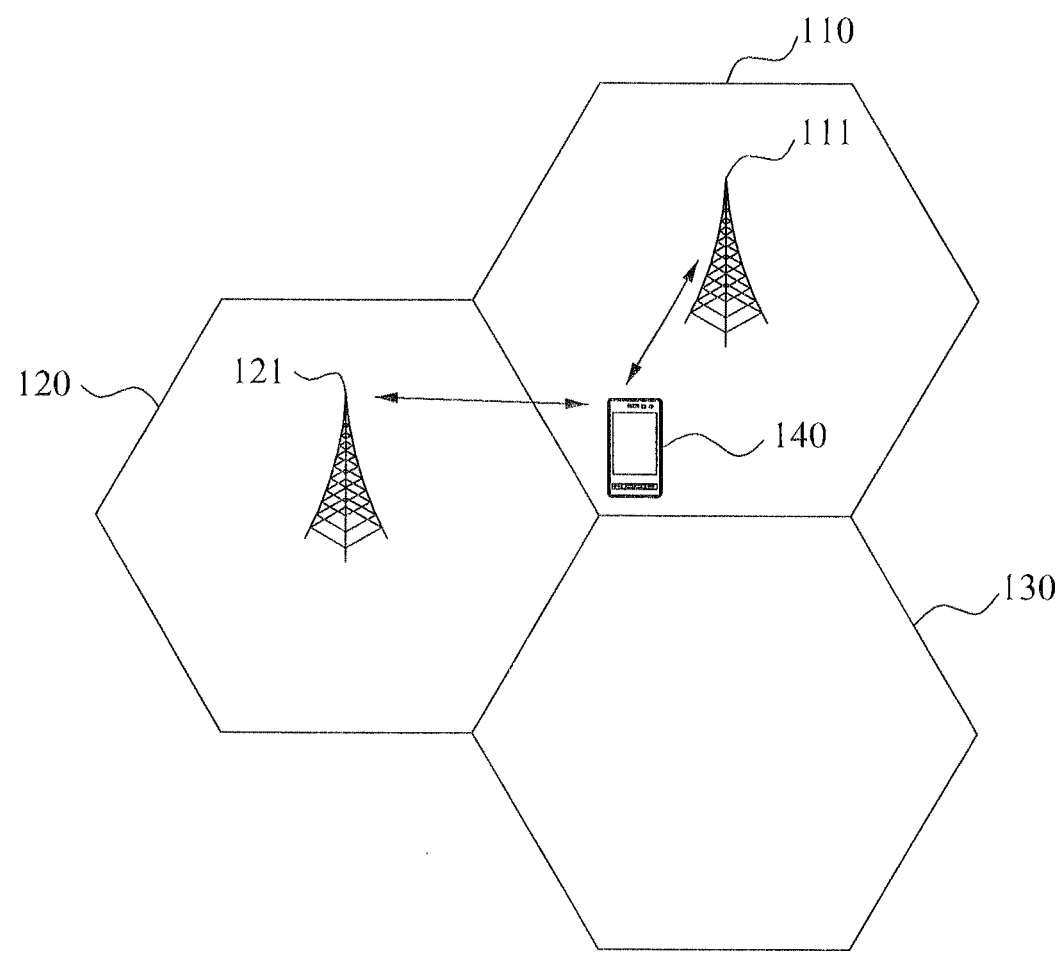
FIG. 1 is a diagram illustrating an interference control system according to an embodiment of the present invention.

Reference will now be made in detail to example embodiments, examples of which are illustrated in the accompanying drawings, wherein like reference numerals refer to the like elements throughout.

FIG. 1 illustrates an interference control system according to an embodiment of the present invention.

A serving cell 110 may include a serving base station 111 and a terminal 140. The terminal 140 may be located in the serving cell 110, and may receive data from the serving base station 111. When the terminal 140 is located outside the serving cell 110, a cooperation base station 121 included in a cooperation cell 120 may transmit an interference signal to the terminal 140. This is referred to as an inter-cell interference.

To decrease an affect of inter-cell interference, cooperation transmission schemes have been researched. According to the cooperation transmission scheme, a plurality of cells 110 and 120 cooperatively transmit a signal, thereby decreasing the affect of an interference signal transmitted to the terminal 140.

A Joint Processing scheme, as one example of the cooperation transmission schemes, may be a scheme where the terminal 140 may simultaneously receive the same data from the plurality of cells 110 and 120. The same data is transmitted from the plurality of cells 110 and 120, and thus, a data reception performance of the terminal 140 may increase as a signal from the cooperation cell 120 is strong.

A Coordinated Scheduling scheme, as another example of the cooperation transmission schemes, may be a scheme where only one cell from among the plurality of cells 110 and 120 may transmits data to the terminal 140 at a predetermined point in time. Remaining cells front among the plurality of cells 110 and 120 may not transmit data to corresponding resources so as to not generate the interference signal for the terminal 140

According to another example of the cooperation scheduling scheme, the cooperation cell 120 may perform precoding of data to prevent the interference signal from being transmitted to the terminal 140 or to transmit a weaken interference signal to the terminal 140.

According to the cooperation transmission scheme, the terminal 140 may transmit formation associated with the plurality of cells 110 and 120 to a serving base station 111 that may control the serving cell 110 and the serving base station 111 may share the information with a cooperation base station 121 that may control the cooperation cell 120, and thus, an optimal transmission scheme with respect to the terminal 140 may be determined.

1. Feed Back Information Associated with Single Cell

Hereinafter, various examples where the terminal 140 transmits, to the serving cell 110, channel state information (CSI) associated with the serving cell 110 will be described in detail.

1) Codebook-Based Precoding MIMO Scheme

When each of the plurality of cells 110 and 120 has a plurality of transmission antennas, the following codebook-based precoding MIMO scheme may be performed.

When a number of each of the plurality of cells 110 and 120 is N, a precoding matrix constituting the codebook may be an N×N matrix as given in Equation 1. The codebook may be constituted by a plurality of precoding matrices. Each column vector of a precoding matrix may be a precoding vector. Each of $\vec{P}_1, \ldots, \vec{P}_N$ in Equation 1 may be the precoding vector.

$$P = \begin{bmatrix} P_{11} & \cdots & P_{1N} \\ P_{21} & \cdots & P_{2N} \\ \vdots & & \vdots \\ P_{N1} & \cdots & P_{NN} \end{bmatrix} = [\vec{P}_1, \ldots, \vec{P}_N] \quad \text{[Equation 1]}$$

According to an embodiment, the terminal 140 may transmit, to the serving cell base station 111, a precoding matrix index (PMI) with respect to a specific resource block or may transmit a PMI with respect to a desired resource block of the terminal 140.

The resource block may be a predetermined frequency block or may be a predetermined time section.

The serving cell base station 111 may select a precoding matrix to be used for data transmission based on the PMI received from the terminal, and may transmit, to the terminal 140, data based on the selected precoding, matrix.

2) Feedback Including Channel Matrix and Effective Noise

The terminal 140 may obtain a channel estimation value by estimating a channel. When a number of reception antennas of the terminal 140 is $N_R$ and a number of transmission antennas of the serving cell 110 is $N_T$, the channel estimation matrix obtained through the channel estimation may be an $(N_R \times N_1)$ matrix. When the terminal 140 receives data from the serving cell base station 111 using a plurality of subcarriers, a channel matrix of a $k^{th}$ subcarrier is denoted as $H_k$. Accordingly; $H_k$ may be expressed as given in Equation 2.

$$H_k = \begin{bmatrix} H_{k,11} & \cdots & H_{k,1N_T} \\ H_{k,21} & \cdots & H_{k,2N_T} \\ \vdots & & \vdots \\ H_{k,N_R1} & \cdots & H_{k,N_R N_T} \end{bmatrix} \quad \text{[Equation 2]}$$

In this case, the terminal 140 may select a matrix $H_k$ corresponding a single subcarrier representing a plurality of subcarriers in a sub-hand to perform feedback or may feed back a matrix obtained by averaging the subcarriers.

When $S_l$ subcarriers exist in an $l^{th}$ sub-band and it is presumed that $H_{l,j}$ is a channel matrix corresponding to a $j^{th}$ subcarrier, a feedback corresponding to the $l^{th}$ sub-band may be $$\overline{H}_l = \frac{1}{S_l} \sum_{j=1}^{S_l} H_{l,j}.$$

The terminal 140 may feed back $\overline{H}_l$ to the serving cell base station 111 as the feedback with respect to the $l^{th}$ sub-band.

According to an embodiment, the terminal 140 may quantize a channel estimation value, namely $\overline{H}_l$, and may feed back the quantized $\overline{H}_l$, to the serving cell base station 111.

The serving cell base station 111 may need to know an amount of thermal noise and an amount of interference that the terminal 140 receives from the cooperation cell 120 to allocate resources for the terminal 140, and to determine a modulation and Coding Scheme (MCS). The terminal 140 may measure the amount of the interference from the cooperation cell 120 and the amount of the thermal noise of the terminal 140 to report the measured amount to the serving cell base station. A signal obtained by adding the thermal noise of the terminal 140 and the interference from the cooperation cell 120 may be referred to as an effective noise. The terminal may calculate, with respect to the $l^{th}$ sub-band, an average energy of the effective noise among reception signals as given in Equation 3.

$$\sigma_l^2 = \frac{1}{S_l} \sum_{j=1}^{S_l} I_{l,j} \qquad \text{[Equation 3]}$$

Here, $$I_{l,j} = \frac{1}{N_R} \sum_{r=1}^{N_R} I_{l,j}^{(r)},$$

and $I_{l,j}^{(r)}$ is an energy value of an effective noise generated in an $r^{th}$ reception antenna, with respect to a $j^{th}$ subcarrier of an $l^{th}$ sub-band. Specifically, $I_{l,j}$ is obtained by averaging energy values of effective noise generated in a reception antenna. An average effective noise $\overline{\sigma}^2$, obtained by averaging with respect to all sub-bands where the feedback is performed to reduce an amount of feedback information of the terminal, may be fed back. The terminal 140 may calculate the average effective noise $\overline{\sigma}^2$ based on Equation 4 as given below.

$$\overline{\sigma}^2 = \frac{1}{S} \sum_j^S I_j \qquad \text{[Equation 4]}$$

Here, S is a total number of subcarriers, and $I_j$ is a sum value of inter-cell interference obtained with respect to the $j^{th}$ subcarrier and a thermal noise of the terminal 140?

The terminal 140 may calculate, with respect to the $l^{th}$ sub-band, an average energy $\sigma_l^2$ of the effective noise among reception signals or may calculate the average effective noise $\overline{\sigma}^2$ obtained by averaging effective noise with respect to all sub-bands where the feedback is performed.

3) Feedback Including Channel Covariance Matrix and Effective Noise

When $I_k^{(r)}$ is an energy value of an effective noise measured by the terminal 140 and generated in an $r^{th}$ reception antenna of a $k^{th}$ subcarrier, the effective cha matrix may be defined as given in Equation 5.

$$H_k^{eff} = \begin{bmatrix} \frac{H_{k,11}}{\sqrt{I_k^{(1)}}} & \cdots & \frac{H_{k,1N_T}}{\sqrt{I_k^{(1)}}} \\ \frac{H_{k,21}}{\sqrt{I_k^{(2)}}} & \cdots & \frac{H_{k,2N_T}}{\sqrt{I_k^{(2)}}} \\ \vdots & & \vdots \\ \frac{H_{k,N_R1}}{\sqrt{I_k^{(N_R)}}} & \cdots & \frac{H_{k,N_RN_T}}{\sqrt{I_k^{(N_R)}}} \end{bmatrix} \qquad \text{[Equation 5]}$$

The effective channel matrix may be defined as given in Equation 6 by substituting $\sigma_l^2$ that may be obtained by averaging with respect to the reception antenna, for $I_k^{(r)}$.

$$H_k^{eff} = \begin{bmatrix} \frac{H_{k,11}}{\sigma_l} & \cdots & \frac{H_{k,1N_T}}{\sigma_l} \\ \frac{H_{k,21}}{\sigma_l} & \cdots & \frac{H_{k,2N_T}}{\sigma_l} \\ \vdots & & \vdots \\ \frac{H_{k,N_R1}}{\sigma_l} & \cdots & \frac{H_{k,N_RN_T}}{\sigma_l} \end{bmatrix} = \frac{1}{\sigma_l} H_k \qquad \text{[Equation 6]}$$

The terminal 140 may calculate an effective channel covariance matrix of the $k^{th}$ subcarrier, namely, $\Omega_k^{eff}$ as given in Equation 7, $$\Omega_k^{eff} = (H_k^{eff})^H H_k^{eff} \qquad \text{[Equation 7]}$$

Here, $(H_k^{eff})^H$ may denote a matrix obtained when $H_k^{eff}$ is transposed and complex conjugated. Accordingly, $\Omega_k^{eff}$ may be a ($N_T \times N_T$ Hermitian matrix.

The terminal 140 may set: a plurality of successive subcarriers as a sub-band to perform feedback. When the number of subcarriers included in the $l^{th}$ sub-band is $S_l$ and a covariance matrix of the $j^{th}$ subcarrier included in the $l^{th}$ sub-band is $\Omega_{l,j}^{eff}$, a covariance matrix with respect to the $l^{th}$ sub-band may be $Z_l^{eff}$. $Z_l^{eff}$ may be calculated as given in Equation 8.

$$Z_l^{eff} = \frac{1}{S_l} \sum_{j=1}^{S_l} \Omega_{l,j}^{eff} \qquad \text{[Equation 8]}$$

The terminal 140 may feed back $Z_l^{eff}$ to the serving cell base station 111, as feedback with respect to the $l^{th}$ sub-band.

4) Feedback Including Effective Noise, Eigenvalue, and Channel Eigen Matrix

The terminal 140 may perform singular value decomposition (SVD) of a covariance matrix, namely, $Z_l$, based on Equation 9.

$$Z_l = V_l \Lambda_l V_l^H \qquad \text{[Equation 9]}$$

$$= [V_{l,1}, V_{l,0}][\Lambda_{l,1}, 0][V_{l,1}, V_{l,0}]^H$$

Here, "0" may denote a matrix of which elements are all zero. $V_{l,1}$ denote an eigen matrix that may include eigenvectors as column vectors and the eigenvectors may have eigenvalues being different from zero. $\Lambda_{l,1}$ may have a form of Equation 10 as given below, when a number of the eigenvalues being different from zero is R.

$$\Lambda_{l,1} = \begin{bmatrix} \lambda_1 & 0 & 0 & 0 \\ 0 & \lambda_2 & 0 & 0 \\ 0 & 0 & \ddots & 0 \\ 0 & 0 & 0 & \lambda_R \\ 0 & 0 & 0 & 0 \\ 0 & 0 & 0 & 0 \\ 0 & 0 & 0 & 0 \\ 0 & 0 & 0 & 0 \end{bmatrix}$$ [Equation 10]

Here, $\lambda_1, \ldots, \lambda_R$ may correspond to the eigenvalues of $Z_l$, the eigenvalue being different from zero. $V_{l,1}$ may be a channel eigen matrix constituted by R column vectors. An $i^{th}$ column vector of the $V_{l,1}$ may have $\lambda_i$ as its own eigenvalue according to SVD. The terminal may construct feedback information based on $V_{l,1}$, the eigenvalue $\lambda_1, \ldots, \lambda_R$, and $$\sigma_l^2 = \frac{1}{S_l} \sum_{j=1}^{S_l} I_{l,j}$$

that is calculated according to the method described in (2), with respect to the $l^{th}$ sub-band, and may transmit the feedback information to a base station. According to another method, the terminal may transmit to the base station, $V_{l,1}$ and the eigenvalue $\lambda_1, \ldots, \lambda_R$, together with $$\bar{\sigma}^2 = \frac{1}{S} \sum_{j=1}^{S} I_j,$$

respect to the $l^{th}$ sub-band.

5) Feedback Including Eigen Matrix and Effective Eigen Value

When the eigenvalue $\lambda_1, \ldots, \lambda_R$ are divided by an effective noise, a value corresponding to an effective SINR of a corresponding eigen vector may be obtained. For example, $$\frac{\lambda_n}{\sigma_l^2}$$

corresponds to an reception expectation SINR of the terminal of when the base station perform transmission based on an $n^{th}$ column vector of $V_{l,1}$. Accordingly, the base station may determine, based on the value, an MCS of data transmitted to the terminal. For another example of the feedback of the terminal, the terminal may feedback, with respect: to the $l^{th}$ sub-band, an effective eigenvalue $$\left\{ \frac{\lambda_1}{\sigma_l^2}, \ldots, \frac{\lambda_R}{\sigma_l^2} \right\}$$

calculated by dividing $V_{l,1}$ and the eigenvalue $\lambda_1, \ldots, \lambda_R$ by the effective noise. Here, when the average effective noise is used, eigenvalue $$\left\{ \frac{\lambda_1}{\bar{\sigma}^2}, \ldots, \frac{\lambda_R}{\bar{\sigma}^2} \right\}$$

may be fed back as the effective eigenvalue.

6) Feedback Including Eigenvalue and Channel Eigen Matrix (*Channel Eigen Matrix and Feedback Including Eigenvalue?

According to another embodiment, the terminal 140 may perform SVD of an effective channel matrix as given in Equation 11.

$$Z_l^{eff} = V_l^{eff} \Lambda_l^{eff} V_l^{eff H}$$
$$= [V_{l,1}^{eff}, V_{l,0}^{eff}][\Lambda_{l,1}^{eff}, 0][V_{l,1}^{eff}, V_{l,0}^{eff}]^H$$ [Equation 11]

The terminal 140 may construct the feedback information with respect to $l^{th}$ sub-band based on $V_{l,1}^{eff}$ and corresponding eigenvalue $\{\lambda_1^{eff}, \ldots, \lambda_R^{eff}\}$, and may transmit the feedback information to the serving cell base station 111.

2. Feed Back Information Associated with Plurality of Cells

The above description describes that the terminal 140 transmits CSI associated with the serving cell 110 to the serving cell base station 111. Hereinafter, an embodiment describes that the terminal 140 generates CSI associated with the cooperation cell 1201 addition to the CSI associated with the serving cell 110, and transmits the generated CSI associated with the cooperation cell 120 to the serving cell base station 111.

When a number of cells participating in the Joint Processing is $N_{JP}$, a channel matrix of a $k^{th}$ subcarrier in a channel of an $i^{th}$ cell is $H_k^i$. When the $i^{th}$ cell has $N_T^i$ transmission antennas, $H_k^i$ is a $N_R \times N_T^i$ channel matrix. A channel matrix $H_k^{JP}$ with respect to cells participating in a cooperation transmission is described as given in Equation 12.

$$H_k^{JP} = [H_k^1, H_k^2, \ldots, H_k^{N_{JP}}]$$ [Equation 12]

When a plurality of cells participates in the cooperation transmission, a channel estimation value may be a matrix set including a plurality of channel matrices. Accordingly, a corresponding channel covariance matrix may be $\Omega_k^{JP} = [H_k^{JP}]^H H_k^{JP}$.

1) codebook-Based Precoding MIMO Scheme

The codebook may be constituted by precoding matrices or precoding vectors. The terminal 140 may select a desired precoding matrix or a desired precoding vector from the codebook, and may report, to a base station, the selected precoding matrix or the selected precoding vector in a form of feedback. The base station may select a precoding matrix to be actually used in a transmission based on the feedback of the terminal 140.

To reduce interference from neighbor cells, each cell may request a neighbor cell to limit the use of a precoding that gives a significant amount of interference, based on the feedback of the terminal 140. The terminal 140 may feed back, to a serving cell, various types of information as below.

According to an embodiment, the terminal 140 may feed back a PMI that is desired by the cooperation cell 120. The terminal 140 may select a PMI that minimizes a strength of an interference signal from the cooperation cell 120.

According to another embodiment, the terminal 140 may feed back a PMI that is not desired by the cooperation cell 120. The terminal 140 may select a PMI that maximizes a strength of the interference signal from the cooperation cell 120.

The serving cell 110 may transmit the PMI received from the terminal 140 to the cooperation cell 120. The cooperation cell 120 may receive the PMI from the serving cell 110, and may select a precoding matrix based on the received PMI. The cooperation cell 120 may transmit data based on the selected PMI. The cooperation cell 120 may select a precoding matrix that decreases the strength of an interference signal that the cooperation cell 120 transmits to the terminal 140.

2) Feedback Including Channel Matrix and Effective Noise

The terminal 140 may feed back a matrix set $H_k^{JP}=[H_k^1, H_k^2, \ldots, H_k^{N_{JP}}]$ corresponding to a single subcarrier representing a plurality of subcarriers in a sub-band, or may feed back a matrix obtained by averaging the plurality of subcarriers. In a case where the matrix obtained by averaging is fed back, when it is presumed that $S_l$ subcarriers exists in $l^{th}$ sub-band and $H_{l,j}^{JP}$ is a channel matrix corresponding to the $j^{th}$ subcarrier, feedback corresponding to the $l^{th}$ sub-band may be $$\overline{H}_l^{JP} = \frac{1}{S_l}\sum_{j=1}^{S_l} H_{l,j}^{JP}.$$

The terminal 140 may calculate, with respect to the $l^{th}$ sub-band, average energy $\sigma_l^2$ of the effective noise among reception signals or may feed back an average effective noise $\overline{\sigma}^2$ obtained by averaging effective noise with respect to all sub-bands where feedback is performed to reduce an amount of feedback of the terminal.

3) Feedback Including Channel Covariance Matrix and Effective Noise

It is presumed that a number of reception antennas of a terminal is $N_R$ and a number of transmission antennas of a predetermined neighbor cell is $N_T$. In this case, the terminal 140 may perform channel estimation to obtain a channel matrix of the predetermined neighbor cell of a $k^{th}$ subcarrier with respect to a wireless channel between the predetermined neighbor cell and the terminal. When the channel matrix of the neighbor cell of the $k^{th}$ subcarrier is $H_k$, $H_k$ may be expressed by a ($N_R \times N_T$) matrix as given in Equation 13.

$$H_k = \begin{bmatrix} H_{k,11} & \cdots & H_{k,1N_T} \\ H_{k,21} & \cdots & H_{k,2N_T} \\ \vdots & & \vdots \\ H_{k,N_R 1} & \cdots & H_{k,N_R N_T} \end{bmatrix} \quad \text{[Equation 13]}$$

The terminal 140 may generate a channel covariance matrix of the $k^{th}$ subcarrier namely, $\Omega_k$, based on Equation 14.

$$\Omega_k = H_k^H H_k \quad \text{[Equation 14]}$$

Here, $H_k^H$ may denote a matrix obtained when $H_k$ is transposed and complex conjugated. Accordingly, $\Omega_k$ may be a ($N_T \times N_T$) Hermitian matrix.

The terminal 140 may set a plurality of successive subcarriers as a sub-band to perform feedback. When the number of subcarriers included in the $l^{th}$ sub-band is $S_l$ and a covariance matrix of the $j^{th}$ subcarrier included in the $l^{th}$ sub-band is $\Omega_{l,j}$, a covariance matrix with respect to the $l^{th}$ sub-band is $Z_l$, $Z_l$ may be calculated as given in Equation 15.

$$Z_l = \frac{1}{S_l}\sum_{j=1}^{S_l} \Omega_{l,j} \quad \text{[Equation 15]}$$

The terminal 140 may feed back $Z_l$ to a base station as feedback with respect to the $l^{th}$ sub-band.

4) Feedback Including Channel Eigen Matrix, Eigenvalue, and Effective Noise

The terminal 140 may perform SVD of $Z_l$. Specifically, $Z_l$ may be expressed as $Z_l = V_l \Lambda_l V_l^H$ and may also be expressed as $Z_l = [V_{l,1}, V_{l,0}][\Lambda V_{l,1}, 0][V_{l,1}, V_{l,0}]^H$. Here, "0" may denote a matrix of which elements are all zero. $V_{l,1}$ may denote an eigen matrix that may include eigenvectors as a column vectors and the eigenvectors may have eigenvalues being different from zero. $\Lambda_{l,1}$ may have a form of Equation 16 as given below, when a number of the eigenvalues being different from zero $$\Lambda_{l,1} = \begin{bmatrix} \lambda_1 & 0 & 0 & 0 \\ 0 & \lambda_2 & 0 & 0 \\ 0 & 0 & \ddots & 0 \\ 0 & 0 & 0 & \lambda_R \\ 0 & 0 & 0 & 0 \\ 0 & 0 & 0 & 0 \\ 0 & 0 & 0 & 0 \\ 0 & 0 & 0 & 0 \end{bmatrix} \quad \text{[Equation 16]}$$

Here, $\lambda_1, \ldots, \lambda_R$ may corresponds the eigenvalues of $Z_l$, the eigenvalue being different from zero. $V_{l,1}$ may denote a channel eigen matrix constituted by R column vectors. An $i^{th}$ column vector of the $V_{l,1}$ may have $\lambda_i$ as its own eigenvalue, according to SVD. The terminal 140 may construct feedback information based on $V_{l,1}$ with respect to $l^{th}$ sub-band to transmit the feedback information to the base station. In addition, the terminal 140 may transmit the eigenvalues $\lambda_1, \ldots, \lambda_R$.

3. Inter-Cell Interference Control Process

1) Codebook-Based Feedback

The serving cell 110 may receive a PMI from the terminal 140. The serving cell 110 may determine a PMI to be prevented from being used by the cooperation cell 120 or may determine a PMI to be recommended to the cooperation cell 120.

The serving cell 110 may transmit the determined PMI to the cooperation cell 120, and the cooperation cell 120 may select a PMI to be used for data transmission based on the determined PMI transmitted from the serving cell 110.

According to an embodiment, the cooperation cell 120 may receive, from the serving cell 110, the PMI to be prevented from being used by the cooperation cell 120. The cooperation cell 120 may perform data transmission based on remaining PMIs excluding the received PMI.

According to another embodiment, the cooperation cell 120 may receive, from the serving cell 110, the PMI to be recommended to the cooperation cell 120. The cooperation cell 120 may select a PMI to be used for data transmission from among received PMIs.

2) Channel Matrix-Based Feedback

According to an embodiment, the serving cell 110 may receive a channel matrix from the terminal 140. The serving cell 110 may generate a channel covariance matrix based on the channel matrix.

According to another embodiment, the serving cell 110 may receive the channel covariance matrix from the terminal 140.

The serving cell 110 may generate, for each frequency resource with respect to the cooperation cell 120, the channel covariance matrix information associated with radio resources to be protected from interference, as given in Table 1.

TABLE 1

| Frequency Resource Index | Channel Covariance Matrix |
|---|---|
| 0 | $Z_0^{(UE0)}$ |
| 1 | $Z_1^{(UE1)}, Z_1^{(UE0)}$ |
| 2 | $Z_2^{(UE5)}$ |
| . | . |
| . | . |
| . | . |

In Table 1, $Z_l^{(UEk)}$ may denote a channel covariance matrix with respect to an $l^{th}$ frequency resource block with respect to a predetermined neighbor cell of a $k^{th}$ terminal.

The serving cell 110 may generate a channel eigen matrix information with respect to radio resources to be protected from interference for each frequency resource with respect to the cooperation cell 120, as given in Table 2.

TABLE 2

| Frequency Resource Index | Channel Eigen Matrix |
|---|---|
| 0 | $V_{0,1}^{(UE0)}$ |
| 1 | $V_{1,1}^{(UE1)}, V_{1,1}^{(UE0)}$ |
| 2 | $V_{2,1}^{(UE5)}$ |
| . | . |
| . | . |
| . | . |

In table 2, $V_{l,1}^{(UEk)}$ may denote an eigen vector having an eigenvalue being different from zero or may denote a channel eigen matrix constituted by eigen vectors having relatively small eigenvalues, with respect to the $l^{th}$ frequency resource block with respect to the predetermined neighbor cell of the $k^{th}$ terminal. Although not illustrated in Table 2, an eigenvalue corresponding to each eigen matrix may be additionally transmitted.

The serving cell 110 may select cells that may be substantially helpful in performing inter-cell cooperation based on information fed back by the terminal 140, and may report the selected cells to the terminal 140. Generally, the cells may be major interference cells that may mainly give interference to the terminal 140. The terminal 140 may not obtain, by itself, information associated with the number of transmission antennas of the neighbor cell, information associated with a location of a reference signal of each transmission antenna in a time-frequency resource space, and information associated with the codebook used. Accordingly, the serving cell 110 may report, to the terminal 140, information associated with the number of transmission antennas of the main interference cells, information associated with the codebook, and the like. The terminal 140 may calculate, based on the reported information, a precoding restrictive information, a precoding recommended information, a channel covariance matrix, or a channel eigen matrix with respect to a predetermined cell to feed back to the serving cell.

Figure 2:
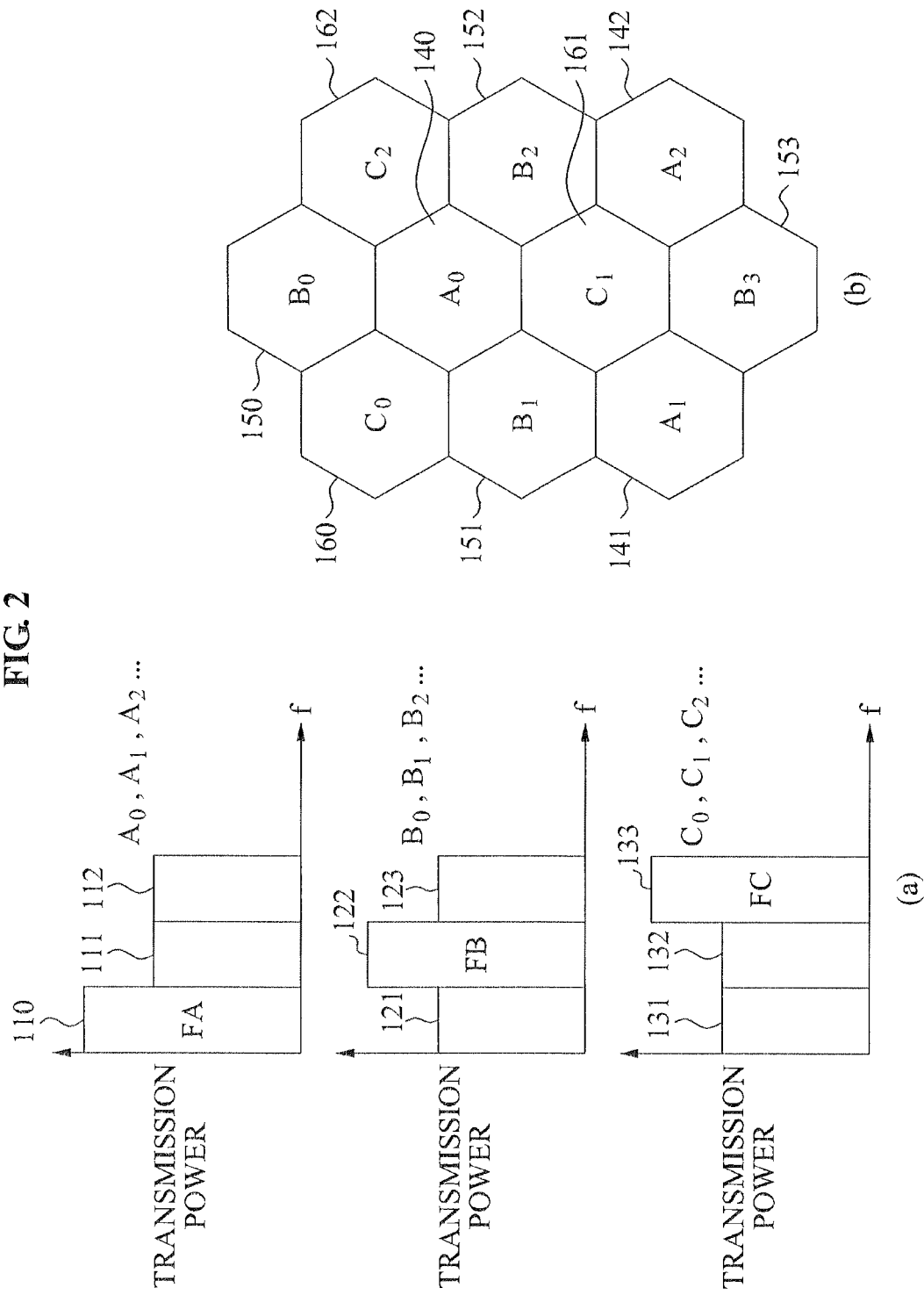
FIG. 2 is a diagram illustrating an example of controlling inter-cell interference based on inter-cell frequency resources allocation according to an embodiment of the present invention.

FIG. 2 illustrates an example of controlling inter-cell interference based on inter-cell frequency resources allocation according to an embodiment of the present invention.

In FIG. 2(*a*), a top graph illustrates transmission power allocation according to a frequency band of cells A0, A1, and A2, a middle graph illustrates transmission power allocation according to a frequency band of cells B0, B1, B2, and B3, and a bottom graph illustrates transmission power allocation according to a frequency band of cells C0, C1, and C2.

A strong transmission power may be allocated to a frequency Allocation FA with respect to the cell A0, A1 and A2, a strong transmission power may be allocated to a frequency bandwidth FB with respect to the cell B0, B1, B2, and B3, and a strong transmission power may be allocated to a frequency bandwidth FC with respect to the cell C0, C1, and C2.

The frequency resources FA may be used as frequency resources for a cell boundary terminal in the cells A0, A1, A2, and the like. In this case, the cells A0, A1, A2, and the like may be masters with respect to the frequency resource FA. The frequency resource FB may be frequency resources for a cell boundary terminal in the cell B0, B1, B2, and the like. In this case, the B0, B1, B2, and the like may be masters respect to the frequency resource FB. The frequency resource FC may be frequency resources for a cell boundary terminal in the cells C0, C1, C2, and the like. In this case, the cells C0, C1, C2, and the like may be masters with respect to the frequency resources FC. Base stations that control the cells A0, A1, A2, and the like may generate PMIs with respect to their main cooperation cells, respectively, or may construct channel information such as Table 1 or Table 2, respectively. Similarly, the base stations that control the cells B0, B1, B2, and the like may construct PMI or channel information with respect to the FB resources, and the base stations that control the cells C0, C1, C2, and the like may construct PMI or channel information with respect to the FC resources. The cooperation cell may control interference based on a PMI or channel information, and thus, the PMI and the channel information may be interference control information.

In Table 1 and Table 2, a frequency resource unit used for providing precoding restrictive information, precoding recommended information, or channel information may be, as an example of a smallest unit, a subcarrier used for transmitting an OFDM scheme, or may be, as an example of a largest unit, all resources used as the cell boundary resources, such as FA, FB, and FC.

In 3GPP LTE, a resource block may be a basic unit for allocating resources to the terminal, and the resource block may be constituted by 12 adjacent subcarriers. Accordingly, the resource block may be preferable to be used as a minimum resource unit when the interference control information is provided. Each base station may construct interference control information to be transmitted to a predetermined cooperation cell, for each resource block.

The serving cell may transmit the constructed interference control information to a corresponding cooperation cell. The transmitted information may be information in a forth in Table 1 or Table 2. The transmission may be performed via an X2 interface which is commonly used for exchanging information between base stations. When a base station is relay node, the information may be exchanged via a wireless channel.

According to an embodiment, a single physical base station may control a plurality of cells. As an example, the single physical base station may control a plurality of sectors constituting a predetermined cell. In this case, the single physical base station may include a plurality of virtual base stations that controls the respective plurality of sectors.

In this case, a serving cell and a cooperation cell included in the same physical base station may be easily controlled by a centralized control. Accordingly, a time delay or an overload of transmission data may not occur when interference control information is exchanged.

Conversely, when the serving cell and the cooperation cell are included in different base stations from each other, namely, when the interference control information is exchanged between different base stations, a distributed control may be performed. Accordingly, due to a time delay through a backhaul and an overload, a following method may be preferable. Hereinafter, an example where the serving cell and the cooperation cell are included in the different physical base stations will be described.

Figure 3:
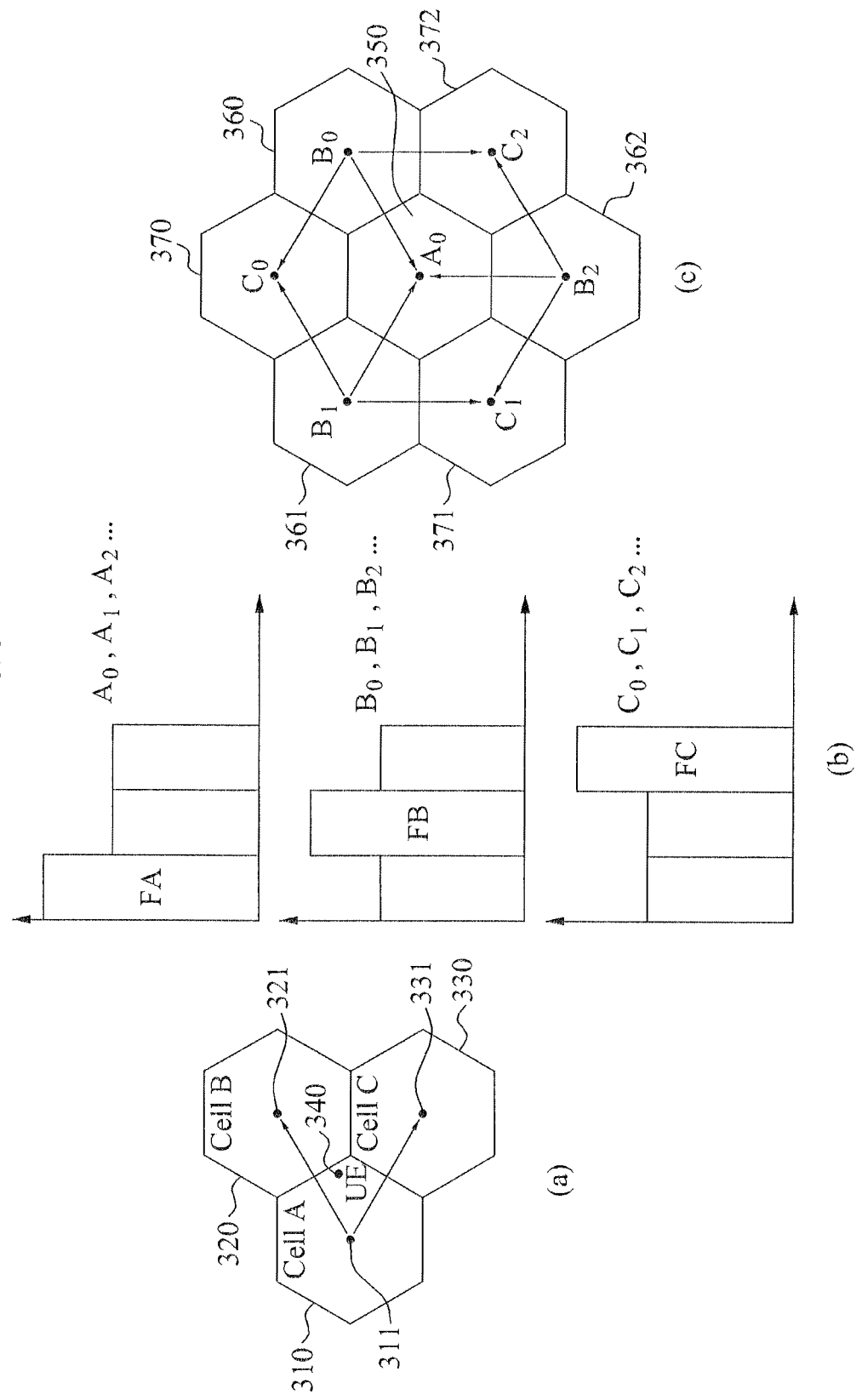
FIG. 3 is a diagram illustrating an inter-cell cooperation and setting of a transmission power according to frequency resources of each cell, when an inter-cell fractional frequency reuse (FFR) and a precoding control scheme is applied.

FIG. 3 illustrates a process of setting a transmission power according to frequency resources of each cell, when an inter-cell fractional frequency reuse (FFR) and a precoding control scheme is applied.

In FIG. 3, a diagram (a) illustrates an example of exchanging interference control information between base stations, and presumes that a single base station observes a single cell. A terminal 340 is included in a coverage of base station A and is located in a cell boundary area. The terminal 340 may receive a strong interference signal from a cooperation cell B 321 and a cooperation cell C 311 which are adjacent to the terminal 340. Arrows in the diagram (a) indicate that the serving cell A 311 transmits interference control information to the cooperation cell B 321 and the cooperation cell C 311 which transmit strong interference signal to the terminal 340.

Cooperation cell that may give strong interference may be changed based on a location of the terminal 340. The serving cell 311 may determine cooperation cells that may perform interference control with respect to the terminal 340 based on a measurement report of the terminal 340, and may report the determined cooperation cells to the terminal 340. The terminal 340 may generate the interference control information only with respect to the cooperation cells 321 and 331 determined by the serving cell 311 and may feed back the generated interference control information to the serving cell 311. Here, the interference control information may be preceding recommended information, preceding restrictive information, or channel information.

In FIG. 3, a diagram (b) illustrates transmission power of each base station in a cellular environment such as a diagram (c). When a FFR scheme is applied, each base station may set the transmission power as illustrated in the diagram (b) to reduce inter-cell interference.

In FIG. 3, arrows in the diagram (c) indicate that cells $B_0$, $B_1$, and $B_2$ that may be master base stations with respect to sub-band of FIG. 2, transmit, to adjacent cooperation cells, interference control requests for their boundary terminals. The base station $A_0$ may receive interference control requests from adjacent base stations $B_0$, $B_1$, and $B_2$.

Receiving interference control requests from the plurality of base stations may frequently occur as in the base station $A_0$. In a case where a plurality of base stations control interference with respect to a predetermined time-frequency resource, when interference control information is restrictive precoding information, a cooperation cell that received the interference control information may not use all precoding indexes to which restrictive precoding is requested.

When the interference control information is precoding recommend information and precoding recommended information transmitted from a plurality of cells are different from each other, the cooperation cell that received the interference control information may select one of precoding recommended information and may report a precoding index to be actually used to a serving cell, thereby enabling each serving cell to perform scheduling of a corresponding cell boundary terminal.

When the interference control information is a channel covariance matrix or a channel eigen matrix, it is preferable that the cooperation cell that may receive the interference control information selects, based on information of Table 1 or Table 2, a precoding that may minimize interference for each resource block. As an example, in Table 1, when the cooperation cell use a predetermined precoding matrix, the cooperation cell may calculate an amount of interference for a terminal that may use resources corresponding to a $0^{th}$ frequency resource index in the serving cell. The cooperation cell may calculate the amount of the interference to the terminal based on $Z_0^{(UE0)}$. Accordingly, a precoding that may be applied to a terminal that uses the same resources in the cooperation cell may be selected as a precoding that may give small interference to a terminal that uses the same resources in the serving cell.

Figure 4:
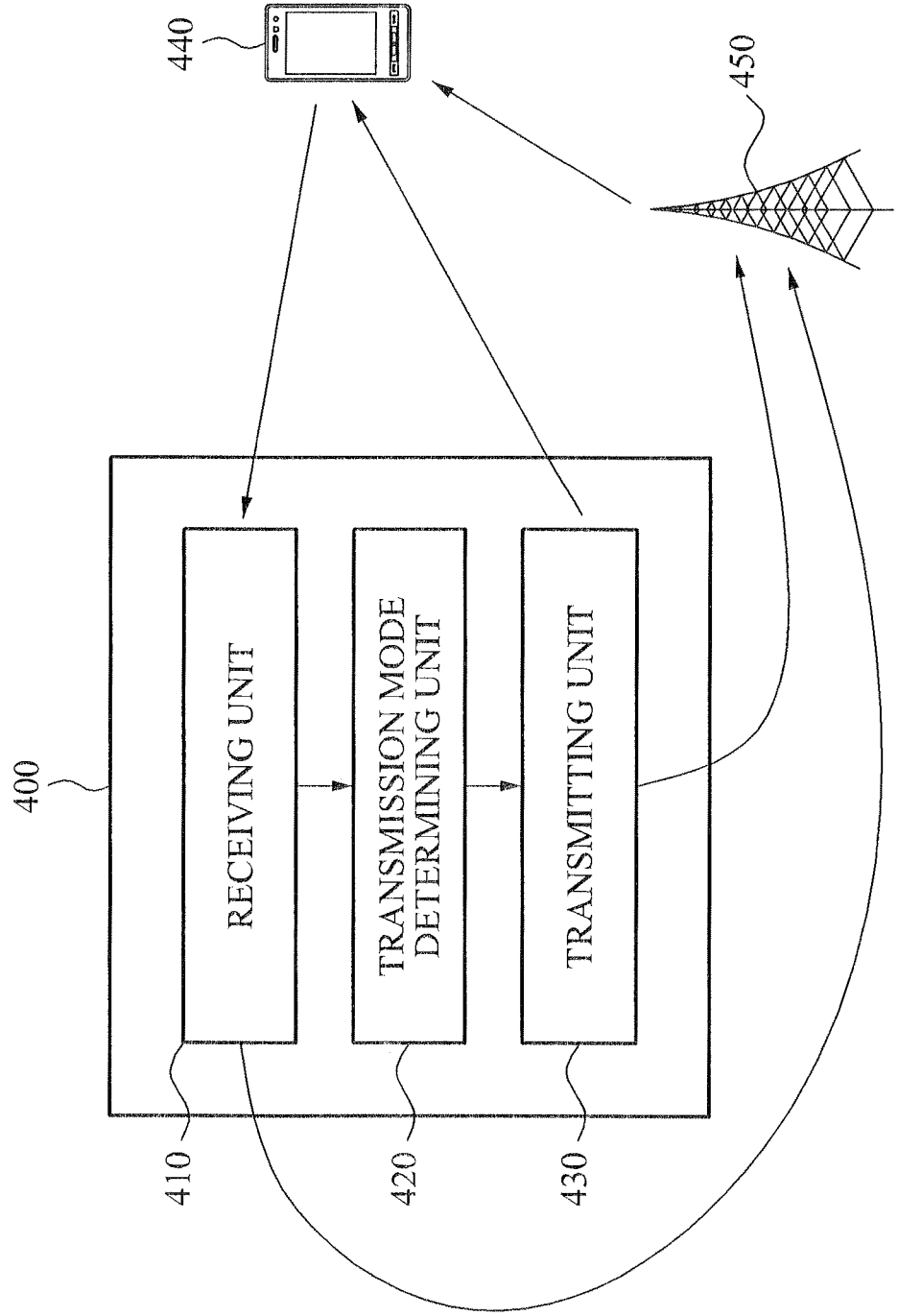
FIG. 4 is a block diagram illustrating a configuration of a serving cell according to an embodiment of the present invention.

FIG. 4 illustrates a configuration of a serving cell base station 400 according to an embodiment of the present invention.

The serving cell base station 400 may include a receiving unit 410, a transmission mode determining unit 420, and a transmitting unit 430.

The receiving unit 410 may receive, from the terminal 440, information associated with a first channel between the serving cell 400 and a terminal 440. The receiving unit 410 may receive, from the terminal 440, information associated with a second channel between a cooperation cell 450 and the terminal 440.

The information associated with the first channel may be used as interference control information for the serving cell 400. According to an embodiment, the information associated with the first channel may be an estimation value generated by estimating the first channel between the serving cell 400 and the terminal 440. When the serving cell 400 or the terminal 440 uses a plurality of antennas, the channel estimation value may be in a form of a vector or a matrix. Hereinafter, it is presumed that the serving cell 400 and the terminal 440 use the plurality of antennas and the channel estimation value is in the form of a matrix, throughout the present specification.

A channel estimation value with respect to information associated with the second channel may also be in a form of matrix.

According to an embodiment, the transmitting unit 430 may transmit a pilot signal to the terminal 440. The terminal 440 may generate the information associated with the first channel based on the pilot signal. Similarly, the terminal 440 may generate the information associated with the second channel based on the pilot signal received from the cooperation cell 450.

The terminal 440 may estimate the first channel, and may quantize a channel estimation value of the first channel to generate the information associated with the first channel. The receiving unit 410 may receive the quantized channel estimation value as the information associated with the first channel. Similarly, the terminal 440 may quantize the channel estimation value of the second channel to generate the information associated with the second channel. The receiving unit 410 may receive the quantized channel estimation value as the information associated with the second channel.

According to another embodiment, the information associated with the first channel may include information associated with a strength of an interference signal that the terminal 440 receives from the cooperation cell 450 and may include information associated with a thermal noise of the terminal 440. The serving cell 440 may allocate radio resource to the terminal 440 and may determine a modulation scheme or a coding scheme, based on the information associated with the strength of the interference signal and based on the information associated with thermal noise.

According to another embodiment, information associated with each channel may be an eigenvalue of a covariance matrix with respect to each channel. The terminal 440 may generate the covariance matrix with respect to each channel based on an estimation value with respect to each channel. The terminal 440 may feed back, as the information associated with each channel, the covariance matrix with respect to each channel. The terminal 440 may perform SVD of the covariance matrix with respect to each channel to calculate eigenvalues of the covariance matrix. The terminal 440 may feed back, as the information associated with each channel, the eigenvalues of the covariance matrix.

According to another embodiment, the serving cell 400 and the cooperation cell 450 may transmit data to the terminal 440 based on a codebook. The serving cell 400 and the cooperation cell 450 may select one matrix among a plurality of precoding matrices included in the codebook, and may multiply the data by the selected precoding matrix to generate data to be transmitted via respective antennas.

The terminal 440 may feed back, as the information associated with each channel, a PMI with respect to each channel.

According to an embodiment, the terminal 440 may feed back, as the information associated with the first channel, a preferred PMI. Also, the terminal 440 may feed back, as the information associated with the second channel, a PMI that is preferred, by the cooperation cell 450.

According to another embodiment, the terminal 440 may feed back, as the information associated with the first channel, a PMI preferred by the serving cell 440. The terminal 440 may feed back, as the information associated with the second channel, the PMI that is not preferred by the cooperation cell 450.

The transmission mode determining unit 420 may determine a cooperation transmission mode with respect to the terminal 440 based on the information associated with the first channel and the information associated with the second channel. As an example, the transmission mode determining unit 420 may determine one of a Joint Processing mode and a Coordinated Scheduling mode as the cooperation transmission mode with respect to the terminal. The Joint Processing mode may be a cooperation transmission mode where the serving cell 400 and the cooperation cell to simultaneously transmit data to the terminal 440, and the Coordinated Scheduling mode is a cooperation transmission mode where one of the serving cell 440 and the cooperation cell 450 transmits data to the terminal 440 at a predetermined point in time.

The transmitting unit 430 may transmit data, to the terminal 440, according to the determined cooperation transmission mode.

Figure 5:
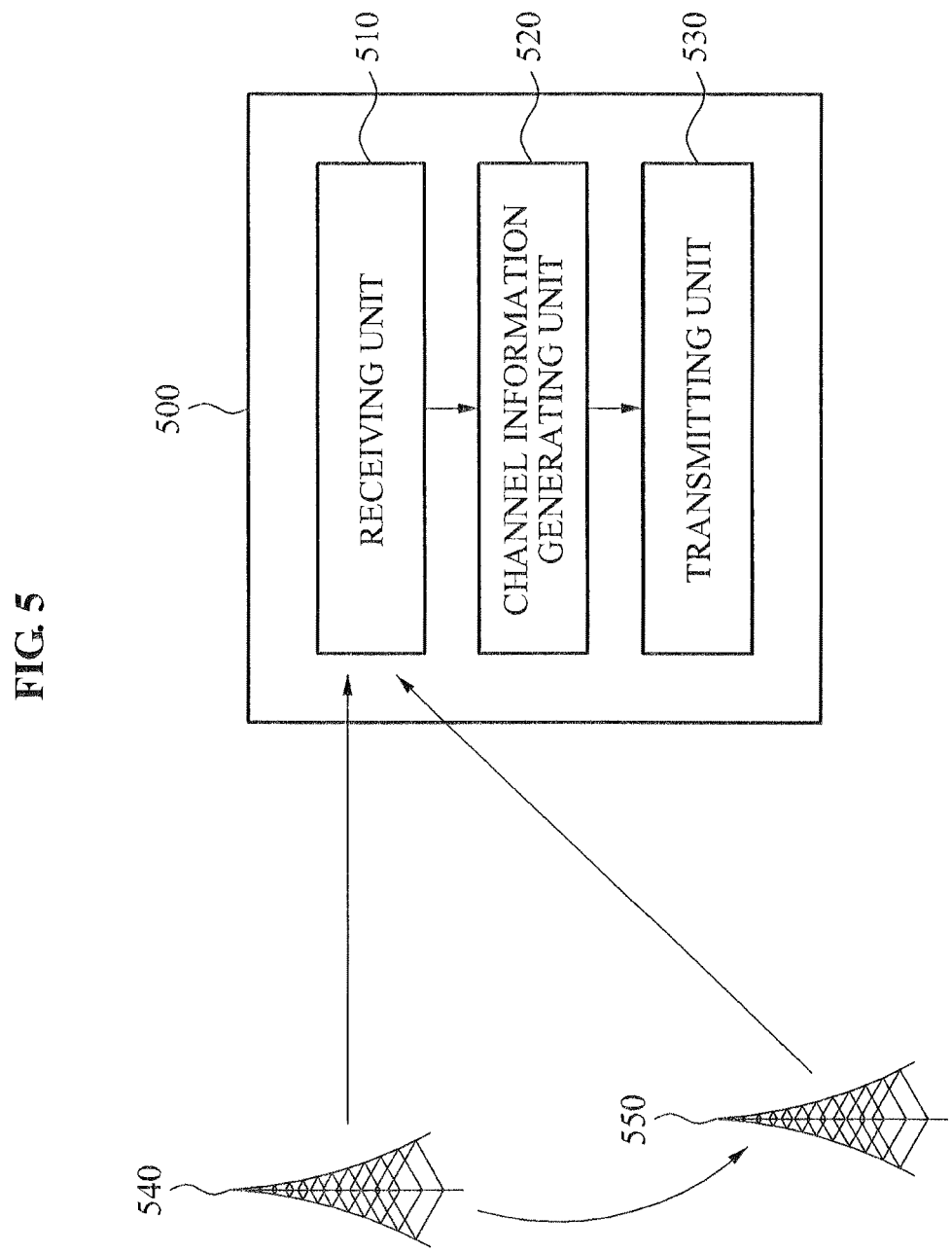
FIG. 5 is a block diagram illustrating a configuration of a terminal according to an embodiment of the present invention.

FIG. 5 illustrates a configuration of a terminal 500 according to an embodiment of the present invention.

The terminal 500 may include a receiving unit 510, a channel information generating unit 520, and a transmitting unit 530.

The receiving unit 510 may receive a first pilot signal from a serving cell 540. The channel information generating unit 520 may generate information associated with a first channel between the terminal and the serving cell 540 based on the first pilot signal.

Similarly, the receiving unit 510 may receive a second pilot signal from a cooperation cell 550, and the channel information generating unit 520 may generate information associated with a second channel between the terminal and the cooperation cell 550 based on the second pilot signal.

According to an embodiment, the serving cell and the cooperation cell 550 may transmit data based on a precoding scheme. The precoding scheme may transmit precoded data via a plurality of antennas to intensively transmit data to a predetermined direction or to decrease a strength of an interference signal transmitted to a predetermined direction.

According to an embodiment, the channel information generating unit 520 may generate a PMI with respect to the first channel as the information associated with the first channel, and may generate a PMI with respect to the second channel as the information associated with the second channel.

Specifically, the channel information generating unit 520 may generate, as the information associated with the first channel, a PMI that the serving cell 540 prefers to use in the precoding scheme, and may feed back the generated information associated with the first channel to the serving cell 540. When the serving cell 540 transmits data based on a precoding matrix preferred by the channel information generating unit 520, the transmitted data may be transmitted to the terminal 500 via the first channel.

The channel information generating unit 520 may generate, as the information associated with the second channel, a PMI that the cooperation cell 550 prefers to use in the precoding scheme. When the cooperation cell 550 transmits data based on a precoding matrix preferred by the channel information generating unit 520, a magnitude of inter-cell interference occurring due to the transmitted data may decrease.

According to another embodiment, the channel information generating unit 520 may generate, as the information associated with the first channel, a PMI that the serving cell 540 prefers to use in the precoding scheme, and may generate, as the information associated with the second channel, a PMI that the cooperation cell 550 may not prefer to use in the precoding scheme.

The serving cell 540 may determine a precoding matrix based on the information associated with time first channel that is fed back from the terminal 500. According to an embodiment, the serving cell 540 may select a precoding matrix corresponding to a PMI received from the terminal 500 as the precoding matrix to be used for the data transmission. Similarly, the cooperation cell 550 may select the precoding matrix to be used for the data transmission, from among remaining precoding matrices excluding a PMI that is not preferred to be used in the precoding scheme.

According to another embodiment, the channel information generating unit 520 may estimate each channel to generate a channel estimation value of each channel. The terminal 500 or each base station have a plurality of antennas, the channel estimation value may be in a form of a vector or a matrix. For ease of description, the channel estimation value is referred to as a channel matrix.

The channel information generating unit 520 may quantize a channel matrix with respect to each channel to generate information associated with each channel, and the transmitting unit 530 may transmit the information associated with each channel to the serving cell 540.

According to an embodiment, the channel information generating unit 520 may measure a strength of inter-cell interference received from the cooperation cell 550 and a thermal noise of the terminal 500, and may include the strength of the inter-cell interference and the thermal noise as the information associated with each channel.

The serving cell 540 may allocate radio resources to the terminal 500 based on the strength of inter-cell interference and the thermal noise. The serving cell 540 may determine a modulation scheme or a coding scheme with respect to the terminal 500, based on the strength of inter-cell interference and the thermal noise.

According to another embodiment, the information associated with each channel may be an eigenvalue of a covariance matrix with respect to each channel. The channel information generating unit 520 may generate a covariance matrix with respect to each channel based on the estimation value with respect to each channel. The channel information generating unit 520 may feed back the covariance matrix with respect to the each channel as information with respect to each channel. The channel information generating unit 520 may perform SVD of the covariance matrix with respect to each channel to calculate eigenvalues of the covariance matrix. The information associated with the first channel and the information associated with the second channel may include eigenvalues of the covariance matrix with respect to each channel.

The transmitting unit 530 may transmit, to the serving cell 540, information associated with the first channel and the information associated with the second channel. The serving cell 540 may determine a cooperation transmission mode with respect to the terminal 500 based on the information associated with the first channel and the information associated with the second channel.

For example, the serving cell 540 may determine one of the Joint Processing mode and a Coordinated Scheduling mode as the cooperation transmission mode with respect to the terminal 500. The Joint Processing mode may be a cooperation transmission mode where the serving cell 540 and the cooperation cell 550 simultaneously transmit the same data to the terminal 500, and the Coordinated Scheduling mode may be a cooperation transmission mode where one of the serving cell 540 and the cooperation cell 550 transmits data to the terminal 500.

The receiving unit 510 may receive the data transmitted based on the determined cooperation transmission mode.

Figure 6:
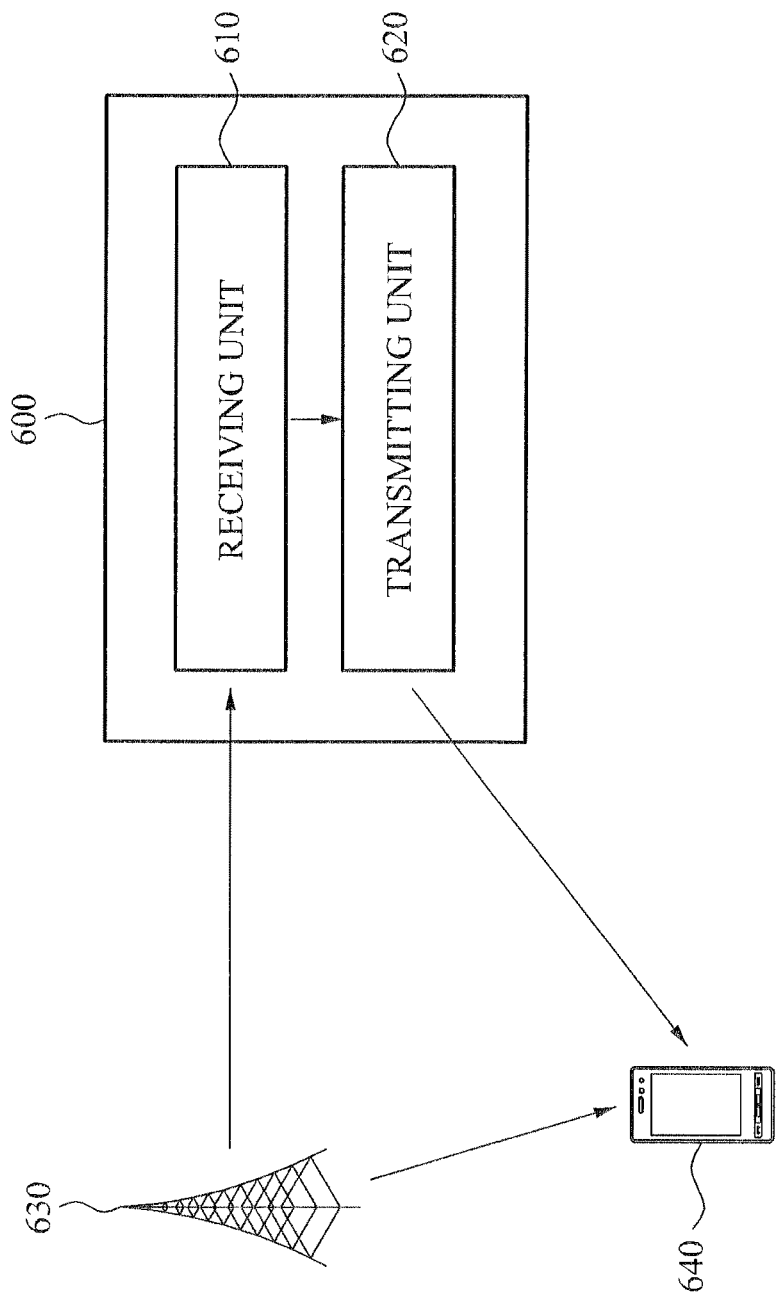
FIG. 6 is a block diagram illustrating a configuration of a cooperation cell according to an embodiment of the present invention.

FIG. 6 illustrates a configuration of a cooperation cell 600 according to an embodiment of the present invention.

The cooperation cell 600 may include a receiving unit 610 and a transmitting unit 620.

The serving cell 630 may transmit a first pilot signal to a terminal 640. The transmitting unit 620 may transmit a second pilot signal to the terminal 640. The terminal 640 may generate information associated with the first channel between the serving cell 630 and the terminal 640 based on the first pilot signal. The terminal 640 may generate information associated with the second channel between the cooperation cell 600 and the terminal 640.

According to an embodiment, the information associated with the first channel may be a PMI that the serving cell 630 prefers to use in a precoding scheme, and the information associated with the second channel may be a PMI that the cooperation cell 640 prefers to use in the precoding scheme.

According to another embodiment, the information associated with the first channel may be the PMI that the serving cell 630 prefers to use in the precoding scheme, and the information associated with the second channel may be a PMI that the cooperation cell 640 may not prefer to use in the precoding scheme.

According to another embodiment, the terminal 640 may estimate each channel to generate a channel estimation value. When the terminal 640 or each of base stations 630 and 600 has a plurality of antennas, the channel estimation value may be in a form of a vector or a matrix. For ease of description, the channel estimation value may be referred to as a channel matrix.

The terminal 640 may quantize the channel matrix with respect to each channel to generate information associated with each channel, and may transmit the information associated with each channel to the serving cell 630.

According to an embodiment, the terminal 640 may measure a strength of inter-cell interference received from the cooperation cell 600 and a thermal noise of the terminal 640 to transmit, to the serving cell 630, the information associated with each channel including the measured strength of the inter-cell interference and the thermal noise.

The serving cell 630 may allocate radio resource with respect to the terminal 640. The serving cell 630 may determine a modulation scheme or a coding scheme with respect to the terminal 640 based on the strength of inter-cell interference and the thermal noise.

According to another embodiment, the information associated with each channel may be an eigenvalue of the covariance matrix with respect to each channel. The terminal 640 may generate the covariance matrix with respect to each channel based on the estimation value respect to each channel. The terminal 640 may feed back, as the information associated with each channel, the covariance matrix with respect to each channel. The terminal 640 may perform SVD of the covariance matrix with respect to each channel to calculate eigenvalues of the covariance matrix. The information associated with the first channel and the information associated with the second channel may include the eigenvalues of the covariance matrix with respect to each channel.

The serving cell 630 may determine the cooperation transmission mode with respect to the terminal 640 based on the information associated with the first channel and the information associated with the second channel.

For example, the serving cell 630 may determine one of a Joint Processing mode and a Coordinated Scheduling mode as the cooperation transmission mode with respect to the terminal 640. The Joint Processing mode is a cooperation transmission mode where the serving cell 630 and the cooperation cell 600 simultaneously transmit the same data to the terminal 640, and the Coordinated Scheduling mode is a cooperation transmission mode where one of the serving cell 630 and the cooperation cell 600 transmits data to the terminal 640.

The receiving unit 610 may receive, from the serving cell 630, information associated with the cooperation transmission mode determined by the serving cell 630, and the transmitting unit 620 may transmit data according to the determined cooperation transmission mode.

Although a few example embodiments have been shown and described, it would be appreciated by those skilled in the art that changes may be made in these example embodiments without departing from the principles and spirit of the invention, the scope of which is defined in the claims and their equivalents.

What is claimed is:

1. An operation method of a serving cell to control interference between the serving cell and a cooperation cell, the method comprising:
    determining the cooperation cell among neighboring cells of the serving cell;
    transmitting information on the cooperation cell to a terminal belonging to the serving cell;
    receiving, from the terminal, desired PMI (Precoding Matrix Indicator) information or undesired PMI information generated based on the information on the cooperation cell; and
    transmitting the desired PMI information or the undesired PMI information to the cooperation cell, wherein the desired PMI information indicates PMI which is to be used by the cooperation cell and the undesired PMI information indicates PMI which is not to be used by the cooperation cell.

2. The method of claim 1, the desired PMI information indicates PMI which minimizes strength of interference from the cooperation cell and the undesired PMI information indicates PMI which maximizes strength of interference from the cooperation cell.

3. The method of claim 1, wherein the information on the cooperation cell comprises information associated with a number of transmission antennas of the cooperation cell or information associated with a codebook available by the cooperation cell.

4. The method of claim 1, further comprising:
receiving, from the terminal, strength of interference from the neighboring cells,
wherein the cooperation cell is determined based on the strength of interference from the neighboring cells.

5. An operation method of a terminal belonging to a serving cell, the method comprising:
receiving, from the serving cell, information on a cooperation cell which is determined among neighboring cells of the serving cell; and
generating desired PMI (Precoding Matrix Indicator) information or undesired PMI information using the information on the cooperation cell; and
transmitting the desired PMI information or the undesired PMI information to the serving cell,
wherein the desired PMI information or the undesired PMI information is transferred to the cooperation cell,
wherein the desired PMI information indicates PMI which is to be used by the cooperation cell and the undesired PMI information indicates PMI which is not to be used by the cooperation cell.

6. The method of claim 5, the desired PMI information indicates PMI which minimizes strength of interference from the cooperation cell and the undesired PMI information indicates PMI which maximizes strength of interference from the cooperation cell.

7. The method of claim 5, wherein the information on the cooperation cell comprises information associated with a number of transmission antennas of the cooperation cell or information associated with a codebook available by the cooperation cell.

8. The method of claim 5, further comprising:
measuring strength of interference from the neighboring cells; and
transmitting the strength of interference from the neighboring cells to the serving cell,
wherein the cooperation cell is determined based on the strength of interference from the neighboring cells.

9. The method of claim 5, wherein the terminal is located in a cell boundary of the serving cell and uses frequency band in which transmission power is greater than in other frequency bands among frequency bands assigned to the serving cell.

* * * * *